Dec. 2, 1930.  A. H. LEIPERT  1,783,801
CUSHION CONNECTION FOR VEHICLE CONSTRUCTION
Filed May 17, 1926  3 Sheets-Sheet 1

Inventor
AUGUST H. LEIPERT
By his Attorneys
Redding, Greeley, O'Shea & Campbell

Dec. 2, 1930.  A. H. LEIPERT  1,783,801
CUSHION CONNECTION FOR VEHICLE CONSTRUCTION
Filed May 17, 1926   3 Sheets-Sheet 2

Inventor
AUGUST H. LEIPERT
By his Attorneys
Redding, Greeley, O'Shea & Campbell

Patented Dec. 2, 1930

1,783,801

UNITED STATES PATENT OFFICE

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE

CUSHION CONNECTION FOR VEHICLE CONSTRUCTION

Application filed May 17, 1926. Serial No. 109,479.

In a co-pending application Serial No. 88,561 filed February 16, 1926 by the present applicant, there is disclosed a cushion connection between two parts, say, of a vehicle, one of which parts is to be connected to and supported by the other part involving yielding non-metallic material whereof spaced portions are retained under internal static pressure and are secured, respectively, to the two parts. In respect of this connection the degree of separation of the connected parts is limited by a fabric link adapted to extend therebetween and be connected thereto. The present invention relates to a cushion connection of the same general character as that forming the subject matter of the copending application. One object of the present invention is a connection and support in which the yielding non-metallic material is capable of distortion under compression without communicating its change of dimension to or affecting the dimension of the link. Accordingly, the block of non-metallic yielding material is formed preferably axially thereof, with a passage through which a link may extend, there being no physical connection between the two. Another object of the invention is the provision of an improved link which, in some circumstances, may be found more convenient to assemble with the block of yielding non-metallic material. The link, accordingly, may comprise a doubled band of fabric, looped about a transverse member carried with one of the connected parts and having its two ends secured to the other part. A further aspect of the invention contemplates the utilization of the link as a means for determining the degree of compression to which the block is subjected. This is particularly advantageous in situations where it is desired to place the block of yielding non-metallic material, initially, under a predetermined compression before its assembly with the parts to be connected. In this instance, a link is passed through apertured seats engaging opposed ends of the block and through a passage in the block, the seats are pressed toward each other and the ends of the link are passed around keys so that when a portion of the pressure is released the separation of the seats will be determined by the link and the block retained under the desired degree of compression.

These and other objects of the invention and the means for their attainment will be more apparent from the following detailed description taken in connection with the accompanying drawings illustrating preferred embodiments of the invention, in which.

Figure 1:
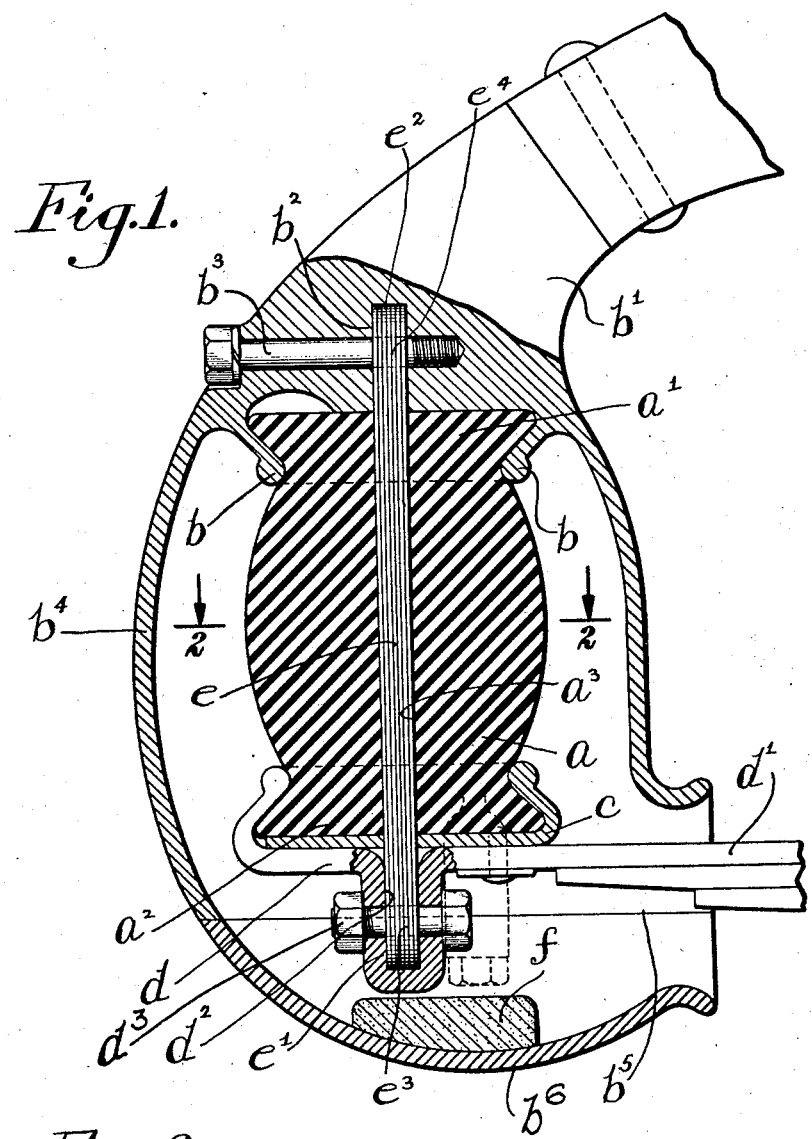
Figure 1 is a view, in longitudinal, vertical section, showing the block of yielding non-metallic material according to the present invention secured to a leaf spring and frame of a motor vehicle, whereof the separation is limited by a link.
Figure 2:
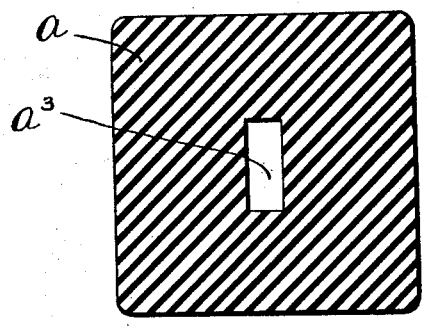
Figure 2 is a horizontal sectional view of the block taken in the plane indicated by the line 2—2 in Figure 1, looking in the direction of the arrows, and showing particularly the passage for the link.

Referring first to Figure 1, as in the previous embodiment, the block $a$ of yielding non-metallic material is flanged at its opposite ends $a'$, $a^2$ for retention by overlying lips $b$, $b$ to the end of the frame member $b'$ and by the lipped seat $c$ and turned back spring end member $d$ to the end of spring $d'$. Separation of the frame and spring end is limited by the link $e$ whereof one end $e'$ is secured within the recess $d^2$ by the bolt $d^3$ and the other end $e^2$ is secured within the recess $b^2$ by the bolt $b^3$. In contradistinction to the previous embodiment, however, the link $e$ is not moulded within the block $a$, but is a separate entity passing through the passage $a^3$ (Figure 2) which is illustrated as formed axially of the block. Thus change in the dimensions of the block will not be communicated to the fabric link.

The block $e$ is preferably formed of rubber since rubber may be readily retained under compression and when so retained its life-resiliency and wearing qualities are increased. Upon assembly the weight of the vehicle will necessarily place the block under compression. This compression may be increased by forcibly bringing the spring end and frame closer together. The bolt holes $e^3$, $e^4$ in the link may be so spaced as to retain the block under the desired degree of compression upon assembly as just described when the block has been reduced in height to the desired degree.

The material of the block is subject to deterioration upon exposure and as a safeguard is surrounded by a shield or housing $b^4$ formed integral with the frame end member $b'$ or separate and secured thereto as shown in the co-pending application U. S. Serial No. 88,561 filed February 16, 1926 by the present applicant. In addition the housing is separable along the line $b^5$ to facilitate the assembly of the spring and block. If desired, a block of yielding non-metallic material $f$ may also be provided carried by the housing cap $b^6$ inwardly thereof, immediately beneath the end of the spring to serve as a buffer in the event of undue elongation of the link or its rupture.

Figure 3:
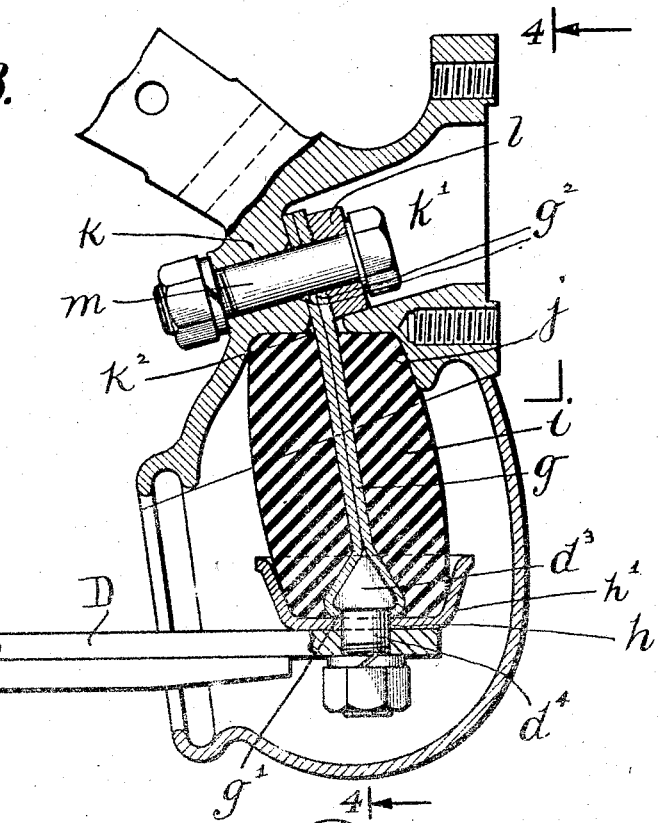
Figure 3 is a view, in longitudinal vertical section, showing a modification of the connection in which the link is doubled and is looped about a transverse bar carried with the vehicle spring and secured by a bolt to the frame.
Figure 4:
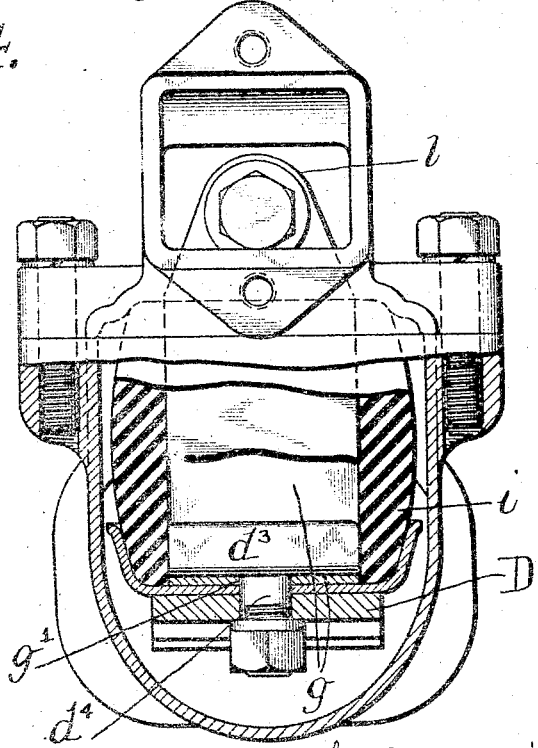
Figure 4 is a transverse sectional view taken in the planes indicated by the broken lines 4—4 in Figure 3, looking in the direction of the arrows and showing the connection according to Figure 3.

In Figures 3 and 4 the link is shown as a strip of fabric $g$ which is looped about a transversely extending member $d^3$ carried with the end of the spring D. Preferably the bar $d^3$ is supported by a bolt $d^4$ which passes through a hole $g'$ in the link and the hole $h$ in a cup-shaped seat $h'$ for the end of the block $i$, a complementary seat $j$ being formed in the frame end $k$. In this embodiment the frame end is formed with an L-shaped aperture $k'$ whereof the leg of the L $k^2$ opens into the seat $j$ and serves as a passage for the ends of the link which pass therethrough and are secured to the frame end by the serrated locking member $l$ and the bolt $m$ which carries the member $l$ and passes through holes $g^2$ in the ends of the link $g$. In this instance the link serves as the connecting element between the spring and frame and the block $i$ is under compression to the degree determined by the link.

Figure 5:
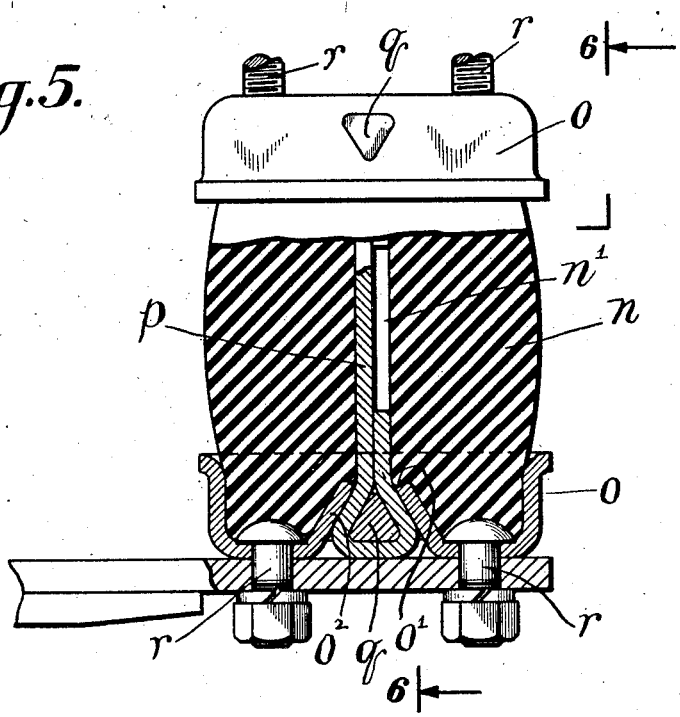
Figure 5 is a view in side elevation and partly in section showing another modification of the connection, wherein the block is placed initially under a predetermined compression and also showing the manner in which the connection as a unit is secured to one of the parts, in this instance, a vehicle leaf spring.
Figure 6:
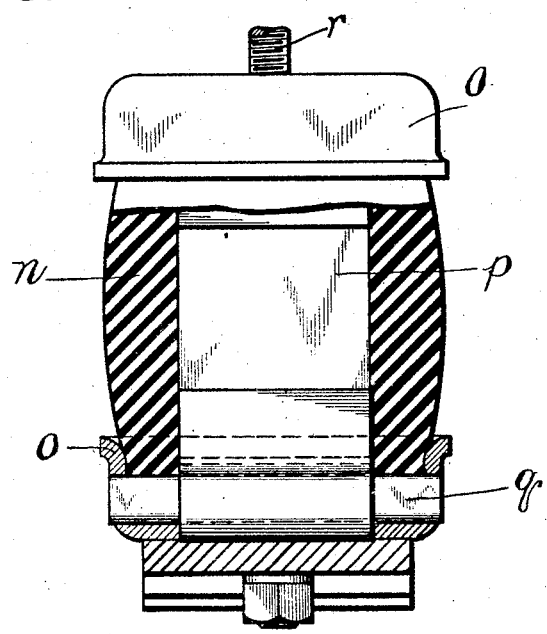
Figure 6 is an end view of the connection shown in Figure 5, parts being broken away in the interest of clearness.

In Figures 5 and 6 a modification of the invention is disclosed in which a block $n$ of yielding non-metallic material is initially placed under a predetermined degree of compression upon its assembly between seats $o$, $o$ by a link $p$ which passes through a passage $n'$ in the block $n$ and apertures $o'$ in the seats $o$. Immediately about the apertures $o'$ the base of the seat is depressed as at $o^2$ to accommodate a key $q$ about which the end of the link is looped. After the seats are forced toward one another to compress the block and the link ends looped about the keys as shown the pressure may be removed and the link maintains the seats at the desired spacing to retain the block under a predetermined degree of compression. The seats may be conveniently secured to the parts to be connected by the bolts $r$ seated on opposite sides of the apertures $o$.

It will thus be seen that a cushion connection has been provided adapted to be interposed between parts to be connected, whereof the block of yielding non-metallic material sustains the load and cushions either part against shocks and vibrations impressed upon the other part and a link determines the extreme separation of the parts and the initial compression of the block.

Various modifications may be made in the composition and configuration of the component elements going to make up the cushion connection as a whole and the various features are interchangeable to form operative combinations within the scope of the invention.

What I claim is:

1. A shackle connection between the spring and frame of a vehicle comprising an inelastic, flexible fabric strip connected at its ends to the spring and frame, respectively, to prevent, positively, the separation thereof, the strip having a greater width than thickness to prevent sidesway of the vehicle body, seats on the spring and frame, and a block of yielding non-metallic material mounted in the seats to cushion movements of one toward the other.

2. A shackle connection between the spring and frame of a vehicle comprising an inelastic, flexible fabric strip connected at its ends to the spring and frame, respectively, to prevent, positively, the separation thereof, seats on the spring and frame, and a block of yielding non-metallic material mounted in the seats to cushion movements of one toward the other, the fabric strip serving to place the block of yielding non-metallic material under a predetermined degree of compression.

3. A shackle connection between the spring and frame of a vehicle comprising an inelastic, flexible fabric strip connected at its ends to the spring and frame, respectively, to prevent, positively, the separation thereof, the strip having a greater width than thickness to prevent sidesway of the vehicle body, seats on the spring and frame, and a block of yielding non-metallic material surrounding the fabric and mounted in the seats to cushion movements of one toward the other, the fabric strip serving to place the block of yielding non-metallic material under a predetermined degree of compression.

This specification signed this 15th day of May, A. D. 1926.

AUGUST H. LEIPERT.